United States Patent
Yang et al.

(10) Patent No.: US 10,418,853 B2
(45) Date of Patent: Sep. 17, 2019

(54) METHODS AND APPARATUS TO WIRELESSLY POWER AN UNMANNED AERIAL VEHICLE

(71) Applicant: Intel Corporation, Santa Clara, CA (US)

(72) Inventors: Songnan Yang, San Jose, CA (US); Hong W. Wong, Portland, OR (US); Zhen Yao, San Jose, CA (US); Essam Elkhouly, Santa Clara, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 15/282,628

(22) Filed: Sep. 30, 2016

(65) Prior Publication Data

US 2018/0095468 A1    Apr. 5, 2018

(51) Int. Cl.
| | |
|---|---|
| *H02J 50/05* | (2016.01) |
| *B64C 39/02* | (2006.01) |
| *B64D 47/08* | (2006.01) |
| *B64D 27/24* | (2006.01) |
| *G05D 1/06* | (2006.01) |

(Continued)

(52) U.S. Cl.
CPC ............ *H02J 50/05* (2016.02); *B60L 53/12* (2019.02); *B60L 53/34* (2019.02); *B64C 39/024* (2013.01); *B64D 27/24* (2013.01); *B64D 47/08* (2013.01); *G05D 1/0676* (2013.01); *B60L 2200/10* (2013.01); *B64C 2201/042* (2013.01); *B64C 2201/066* (2013.01); *B64C 2201/128* (2013.01)

(58) Field of Classification Search
CPC ............ B64C 39/024; B64C 2201/066; B60L 11/182; B60L 11/1829; B60L 2200/10; H02J 50/05
See application file for complete search history.

(56) References Cited

U.S. PATENT DOCUMENTS

| | | | |
|---|---|---|---|
| 3,924,084 A | * 12/1975 | Lindfors | ............ B60L 5/10 191/45 A |
| 4,818,990 A | 4/1989 | Fernandes | |

(Continued)

FOREIGN PATENT DOCUMENTS

| | | |
|---|---|---|
| KR | 20140078251 A | 6/2014 |
| KR | 101489641 B1 | 2/2015 |

OTHER PUBLICATIONS

International Search Report based on Application No. PCT/US2017/048976 (17 pages) dated Nov. 24, 2017.

*Primary Examiner* — Zachary L Kuhfuss
(74) *Attorney, Agent, or Firm* — Viering, Jentschura & Partner MBB

(57) ABSTRACT

Methods, apparatus, systems and articles of manufacture to wirelessly power an unmanned aerial vehicle are disclosed. An example unmanned aerial vehicle (UAV) includes a first electrode assembly to capacitively couple to a first power cable. The example UAV includes a second electrode assembly to capacitively couple to a second power cable. The first and second electrode assemblies, when capacitively coupled to the respective first and second power cables, are to receive power from at least one of the first and second power cables. The example UAV includes a power storage circuit to store the received power.

19 Claims, 11 Drawing Sheets

(51) Int. Cl.
  *B60L 53/12* (2019.01)
  *B60L 53/34* (2019.01)

(56) References Cited

U.S. PATENT DOCUMENTS

| | | | |
|---|---|---|---|
| 7,398,946 B1* | 7/2008 | Marshall | B60L 11/1816 |
| | | | 191/10 |
| 8,405,346 B2* | 3/2013 | Trigiani | B60L 11/1816 |
| | | | 320/108 |
| 9,290,277 B2* | 3/2016 | You | B64F 1/18 |
| 9,421,869 B1 | 8/2016 | Ananthanarayanan et al. | |
| 9,878,787 B2* | 1/2018 | Chan | B64C 39/024 |
| 9,957,048 B2* | 5/2018 | Gil | B64D 1/00 |
| 10,053,218 B2* | 8/2018 | Feldmann | H04B 7/1851 |
| 10,186,348 B2* | 1/2019 | Davis | H01B 7/28 |
| 2014/0055089 A1* | 2/2014 | Ichikawa | H01F 38/14 |
| | | | 320/108 |
| 2015/0069968 A1 | 3/2015 | Pounds | |
| 2015/0336669 A1* | 11/2015 | Kantor | G01C 21/3415 |
| | | | 701/3 |
| 2016/0001883 A1 | 1/2016 | Sanz et al. | |
| 2017/0032686 A1* | 2/2017 | Alonso Tabares | G08G 5/0091 |
| 2018/0043782 A1* | 2/2018 | Ng | B60L 11/182 |

* cited by examiner

METHODS AND APPARATUS TO WIRELESSLY POWER AN UNMANNED AERIAL VEHICLE

FIELD OF THE DISCLOSURE

This disclosure relates generally to unmanned aerial vehicles, and, more particularly, to methods and apparatus to wirelessly power an unmanned aerial vehicle.

BACKGROUND

In recent years, unmanned aerial vehicles (UAVs), which are sometimes referred to as "drones," have become more readily available. Indeed, such UAVs have even become large enough to carry small payloads. Some entities desire to utilize unmanned aerial vehicle technology to facilitate delivery of packages (e.g., mail, goods, etc.), instead of utilizing traditional delivery systems.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

UAV based delivery has been become a reality in recent years. UAVs have been used to deliver small packages from one location to another. Unfortunately, one major challenge for UAV-based delivery is the range of the UAV. Currently, UAVs are estimated to have a range of approximately ten miles from their distribution centers. As a result, UAV-delivery is limited to small geographic areas near a distribution center. Previous approaches to extending a delivery range utilized specially designed charging stations placed along popular routes. However, such an approach sacrifices the speed associated with autonomous delivery, because a UAV must stop to recharge at the charging station.

In examples disclosed herein, existing overhead high-voltage AC power transmission infrastructure(s) (e.g., overhead power cables) are used to supply power to the UAV via capacitive coupling elements. As a result, UAVs can be charged and/or powered while travelling to a destination.

Figure 1:
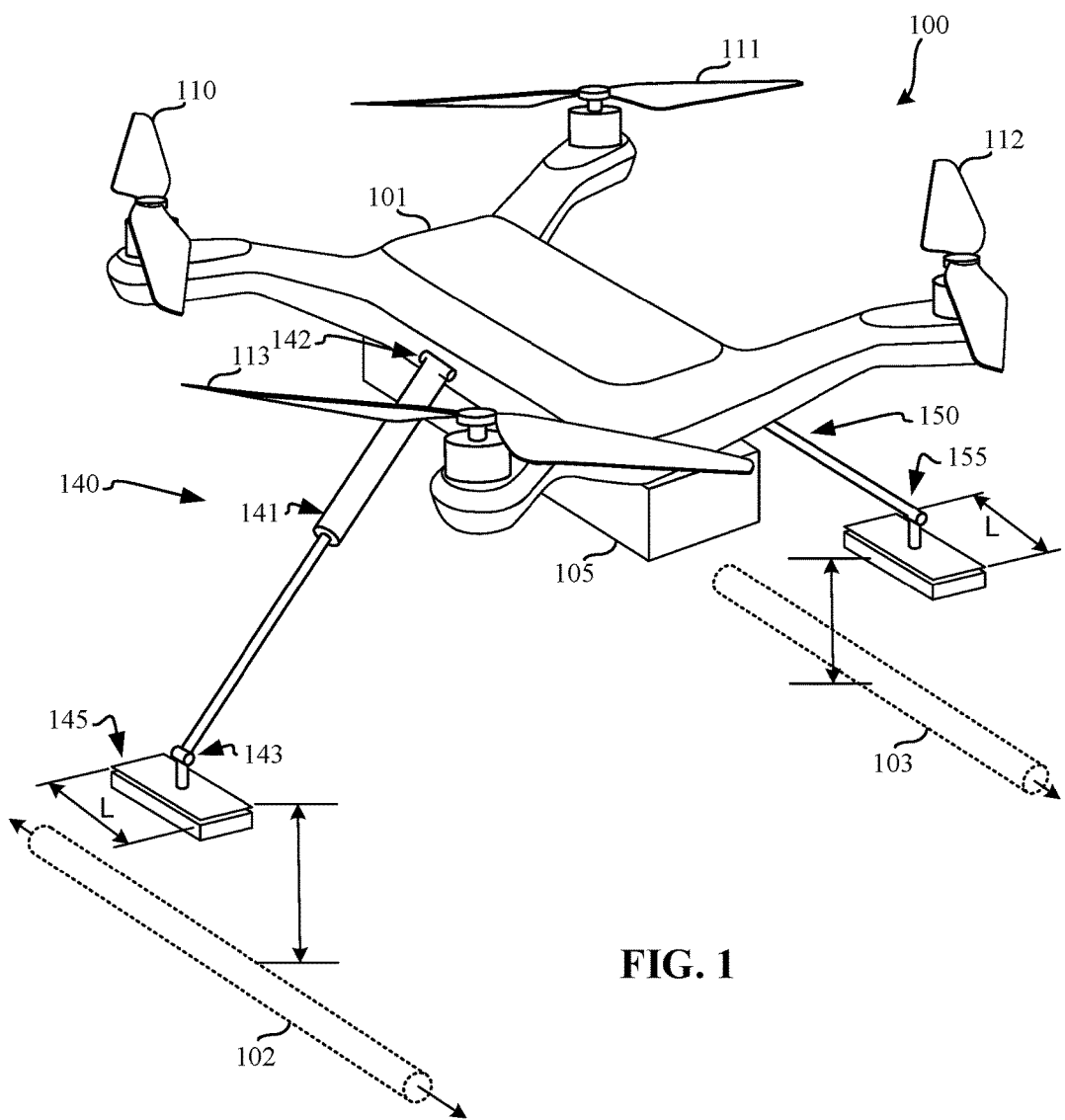
FIG. 1 is an illustration of a UAV operating in an example environment of use.

FIG. 1 is an illustration of a UAV 100 operating in an example environment of use that includes power cables 102, 103. The example UAV 100 of FIG. 1 includes a UAV body 101 that carries a payload 105. Four rotors 110, 111, 112, 113 are mounted to the top of the UAV body and provide lift and directional control for the UAV 100. The example UAV 100 includes two arms 140, 150 that attach to two respective electrode assemblies 145, 155. The UAV 100 is flown such that the electrode assemblies 145, 155 are positioned within a proximity of the power cables 102, 103 (e.g., within a few centimeters of the power cables, touching the power cables, etc.).

In the illustrated example of FIG. 1, the example power cables 102, 103 represent power cables of a high-voltage power transmission system (e.g., a commercial power delivery system). In examples disclosed herein, the two power cables 102, 103 represent two phases of a three-phase transmission line system. In examples disclosed herein, the power lines 102, 103 are operated at 500 kV (e.g., the root mean square (RMS) voltage between the first power cable 102 and a second power cable 103 is 500 kV). However, any other voltage may additionally or alternatively be used. In example disclosed herein, the alternating current (AC) frequency is 60 Hertz (Hz). However, any other voltage and/or frequency (e.g., 50 Hz) may additionally or alternatively be.

In the illustrated example of FIG. 1, four rotors 110-113 are shown positioned at each corner of the UAV body 101. UAVs with four rotors are commonly referred to as a quad-copter. However, any other rotor and/or body configuration may additionally or alternatively be used such as, for example, a six rotor configuration (a hexacopter), an eight rotor configuration (an octocopter), etc. Furthermore, other UAV body and/or rotor configurations may additionally or alternatively be used such as, for example, a helicopter configuration (e.g., a one horizontal rotor and one vertical rotor), a fixed wing configuration, etc.

In the illustrated example of FIG. 1, the arms 140, 150 are adjustable to accommodate different configurations and/or spacing of the power cables 102, 103. In the illustrated example of FIG. 1, the length of the first arm 140 is adjustable by use of an actuator 141. The length of the second arm 150 is likewise adjustable by use of a corresponding actuator. However, any other approach to adjusting an arm length may additionally or alternatively be used such as, for example, pistons.

In the illustrated example of FIG. 1, the first arm 140 is rotatable about a first axis at a first interconnection 142 with the UAV body 101. The first arm 140 rotates about the first axis using a servo. However, any other approach to positioning the first arm 140 with respect to the UAV body 101 may additionally or alternatively be used. The second arm 140 is likewise rotatable around a similar axis at a second interconnection disposed on the opposite side of the UAV body as the first interconnection 142.

In the illustrated example of FIG. 1, the first interconnection 142 and the second interconnection are disposed on opposing sides of the UAV body 101. However, in some examples, the first interconnection 142 and the second interconnection may be located in any other position with respect to the UAV body 101. For example, the first interconnection 142 and the second interconnection may be located at the bottom of the UAV body 101, may be connected to a rotor support mechanism, etc. Moreover, in the illustrated example of FIG. 1, the first interconnection 142 and the second interconnection are located at central point with respect to the front and back of the UAV body 101 (e.g., in line with the center of balance of the UAV). Mounting the first interconnection 142 and the second interconnection along the center of balance of the UAV provides additional stability during flight. However, the first interconnection 142 and the second interconnection may be located at any other location on the UAV body 101. Furthermore, in the illustrated example of FIG. 1, one arm is shown in connection with each electrode assembly. However, in some examples, multiple arms may be used in connection with an electrode assembly.

In the illustrated example of FIG. 1, the first arm 140 enables rotation about a second axis at a third interconnection 143 located at the end of the arm 140 that couples the arm 140 to the electrode assembly 145. As a result, and angle of the electrode assembly 145 can be controlled with respect to the UAV body 101 to ensure that the electrode assembly 145 is properly aligned with the power cable 102. Rotation at the third interconnection 143 is enabled by use of a servo. However, any other approach to positioning the electrode assembly 145 may additionally or alternatively be used. The second arm 150 is likewise adjustable to facilitate positioning of the second electrode assembly 155 with respect to the second power cable 103.

In the illustrated example of FIG. 1, the first electrode assembly 145 and second electrode assembly 155 are connected to corresponding ends of the first arm 140 and the second arm 150. The first electrode assembly 145 is positioned a distance away from the first power cable 102. The second electrode assembly 155 is likewise positioned the same distance away from the second power cable 103. However, in some examples, the distance between the first electrode assembly 145 and the first power cable 102 may be different from the distance between the second electrode assembly 155 and the second power cable 103. In the illustrated example of FIG. 1, the first electrode assembly 145 and the second electrode assembly 155 have a length of L. In some examples, the length of the electrode assemblies is adjustable, and can be controlled to increase and/or decrease the amount of capacitive coupling between the electrode assemblies 145, 155 and the power cables 102, 103. In examples disclosed herein, capacitive coupling of the UAV 100 to power cables 102, 103 is defined to be a transfer of energy from the power cables 102, 103 to the UAV 100 through a through an airgap and/or any other dielectric material (e.g., without conductively coupling the UAV 100 to the power cables 102, 103). Electrode assemblies for capacitively coupling the UAV 100 to the power cables 102, 103 are described in further detail in connection with FIG. 2.

Figure 2:
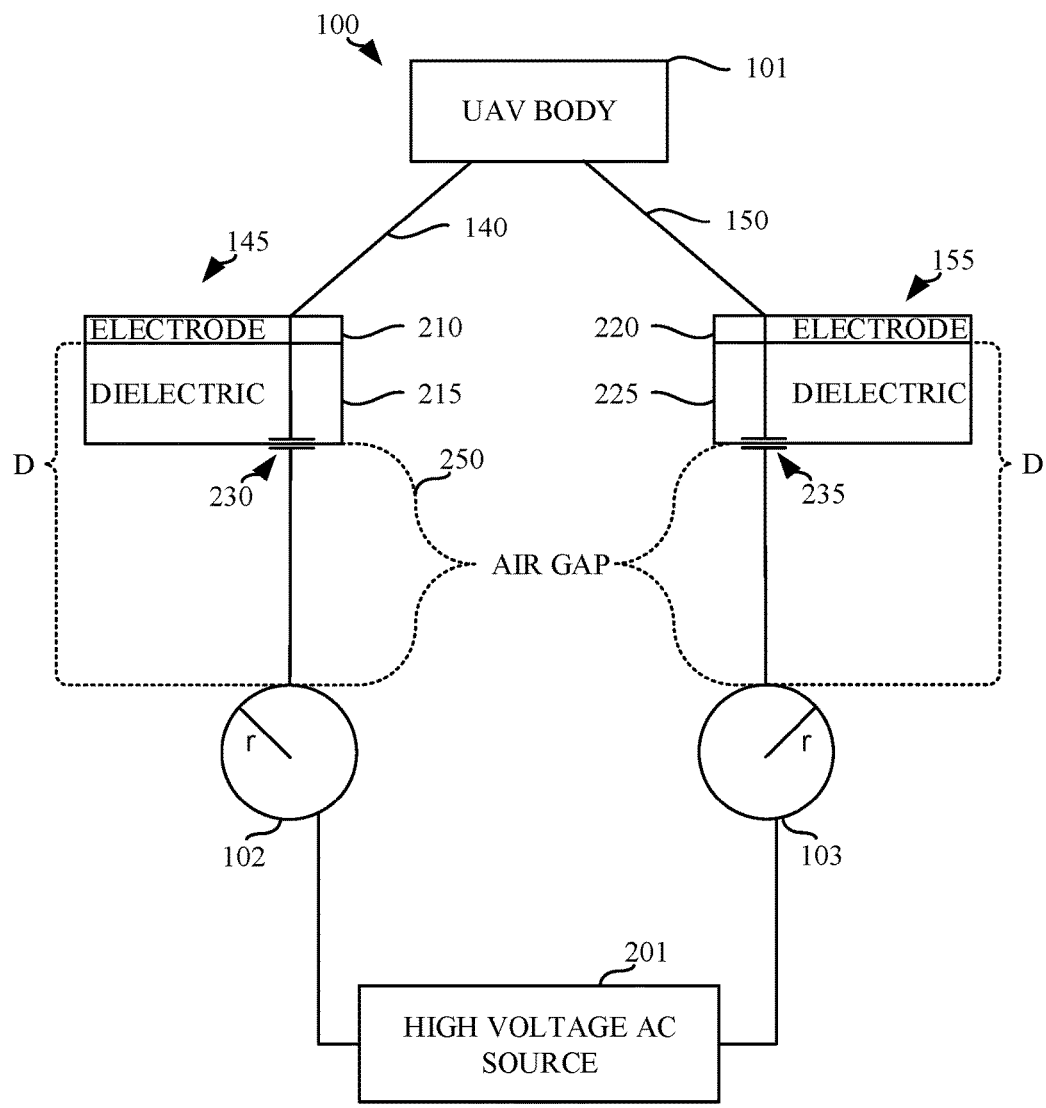
FIG. 2 is a schematic diagram of the UAV of FIG. 1 illustrating a circuit formed in connection with the power cables of FIG. 1.

FIG. 2 is a schematic diagram of the UAV 100 of FIG. 1 illustrating a circuit formed in connection with the power cables 102, 103 of FIG. 1. The illustrated example of FIG. 2 shows the UAV body 101 connected to the first electrode assembly 145 and the second electrode assembly 155 via the first arm 140 and the second arm 150, respectively. In the illustrated example of FIG. 2, the first power cable 102 and the second power cable each have a radius r, and are connected via a high voltage AC source 201.

The example high voltage AC source 201 in the illustrated example of FIG. 2 supplies high voltage AC power (e.g., having a voltage greater than 1000 Volts) to the power cables 102, 103. In examples disclosed herein, the high voltage AC source 201 is supplied by a utility company (e.g., an entity with an existing power delivery infrastructure). However, any other system may additionally or alternatively be used. The example high voltage AC source 201 implements a three phase power delivery system. In such an example, two of the three phases are respectively coupled to the first and second power cables 102, 103. In some examples, other types of power delivery system(s) may additionally or alternatively be used, such as, for example a high voltage direct current (DC) system, a system that supplies voltage at less than high voltage (e.g., 120 volts AC, 12 volts DC, etc).

In the illustrated example of FIG. 2, the first electrode assembly 145 includes a first electrode 210 and a first dielectric 215. The second electrode assembly 155 includes a second electrode 220 and a second dielectric 225. In the illustrated example of FIG. 2, the first electrode 210 is positioned away from the first power cable 102 by a distance D. Likewise, the second electrode 220 is positioned away from the second power cable 103 by the distance D.

An air gap 250 is formed between the first electrode assembly 145 and the first power cable 102, and is also formed between the second electrode assembly 155 and the second power cable 103. The distance D includes both the dielectric 215 and the air gap 250. In examples disclosed herein, the dielectric 215, 225 is made of Teflon material (having a dielectric constant of 2.2), and is four centimeters thick. However, any other material having any other dielectric constant and/or thickness may additionally or alternatively be used. In examples disclosed herein, the UAV 100 is flown such that the air gap 250 is small (e.g., a few centimeters, a meter, etc.). As a result of the close proximity of the electrode assemblies and the power cables, capacitances 230, 235 are formed. The value of the capacitances 230, 235 can be controlled by controlling the separation distance D.

In examples disclosed herein, the maximum power that can be delivered to the UAV 100 is determined based on the capacitances 230, 235, and the voltage of the power cables 102, 103 using the following equation:

$$P_{max} = \frac{\pi}{4} V^2 f C \qquad \text{Equation 1}$$

In the example Equation 1, above, $P_{max}$ represents the maximum power that can be transferred to the UAV 100. V represents the RMS value of the voltage difference between two phases carried by the first and second power cables 102, 103. The variable f represents the AC frequency of the power carried on the power cables 102, 103. C represents the total capacitance created between the electrode assemblies 145, 155 and the power cables 102, 103. C can be calculated as shown in Equation 2, below:

$$C = \frac{C_1 C_2}{C_1 + C_2} \qquad \text{Equation 2}$$

In equation 2, above, $C_1$ represents the first capacitance formed between the first electrode assembly 145 and the first power cable 102. $C_2$ represents the second capacitance formed between the second electrode assembly 155 and the second power cable 103.

Figure 3:
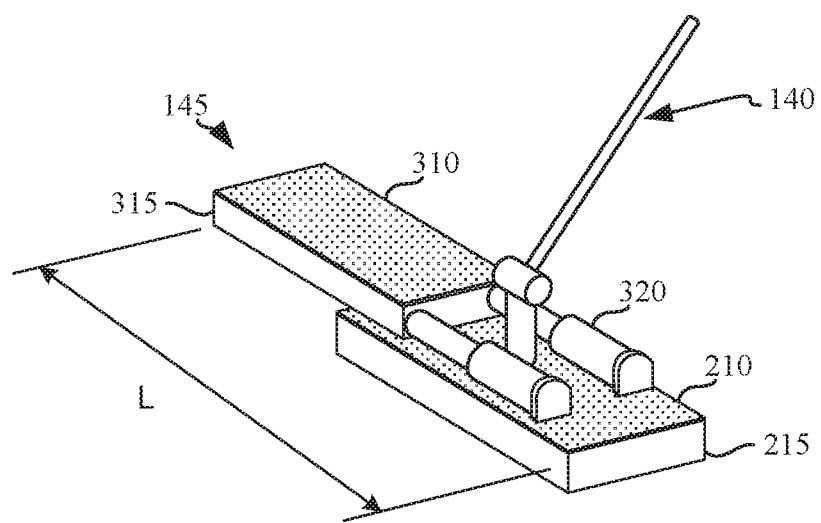
FIG. 3 is an illustration of an electrode assembly of FIG. 1.

FIG. 3 is an illustration of the electrode assembly 145 of FIG. 1. In the illustrated example of FIG. 3, the example electrode assembly 145 includes the first electrode 210, the first dielectric 215, a third electrode 310, a third dielectric 315, and an electrode actuator 320. In the illustrated example of FIG. 3, the first electrode 210 is electrically connected to the third electrode 310. In the illustrated example of FIG. 3, the length L of the electrode assembly 145 is adjustable by use of the electrode actuator 320. As a result, the length L of the electrode assembly 145 can be controlled during travel. In examples disclosed herein, the electrode actuator 320 is implemented using a linear actuator. However, any other approach to controlling a length of the electrode may additionally or alternatively be used.

As noted above, the capacitance formed between the electrode assemblies and the power cables can be controlled to enable collection of power (e.g., for operation of the UAV and/or for charging a battery of the UAV). The capacitance can be calculated using the following equation:

$$C_1 = C_2 = \frac{2\pi\varepsilon L}{\ln\left(\frac{D}{r} + \sqrt{\frac{D^2}{r^2} - 1}\right)} = 2C \qquad \text{Equation 3}$$

In the example equation 3, above, C represents the total capacitance created between the electrode assemblies 145, 155 and the power cables 102, 103, L represents the length of the electrode 210, 220 (e.g., including the added length from the example third electrode 310); D represents the distance between the electrode 210, 220 and the power cable 102, 103 (inclusive of the dielectric 215, 225 and the air gap 250); r represents the radius of the power cables 102, 103, and ε represents the weighted average of the dielectric constant across the distance D. ε for a two dielectric system (e.g., a system with a first dielectric material having a first dielectric constant and a second dielectric material with a second dielectric constant) can be calculated using equation 4, below:

$$\varepsilon = \left(\frac{\delta}{\varepsilon_{dielectric}} + \frac{D - \delta}{\varepsilon_{air}}\right)^{-1} \cdot D \qquad \text{Equation 4}$$

In the example equation 4, above, $\varepsilon_{dielectric}$ represents the dielectric constant of the first and second dielectrics 215, 225. In examples disclosed herein, the first and second dielectrics 215, 225 are made of Teflon, which has a dielectric constant of 2.2. However, any other material having any other dielectric constant may additionally or alternatively be used. In the example equation 4, above, $\varepsilon_{air}$ represents the dielectric constant of an air gap between the first and second dielectrics 215, 225 and the corresponding power cables 102, 103. δ represents the thickness of the first and second dielectrics 215, 225. In examples disclosed herein, the first and second dielectrics 215, 225 are four centimeters thick. However, any other thickness may additionally or alternatively be used. As in Equation 3, D represents the distance between the first and second electrodes 210, 220 and their respective power cables 102, 103. While in the illustrated example of equation 4, two dielectric materials are shown (e.g., the first and second dielectrics 215, 225, and the air gap), other approaches for calculating a dielectric constant of a system with more than two dielectric materials may additionally or alternatively be used.

When, for example, the air gap is minimized to zero (e.g., the dielectric 215, 225 is touching the power cable 102, 103) and Teflon having a four cm thickness is used, ε is calculated to be 2.2. Using the calculated average dielectric constant in Equation 3 results in a total mutual capacitance of approximately 78 pF. Using the calculated capacitance in Equation 1, above, results in a maximum power delivery of 460 Watts. Separating the electrode assemblies 145, 155 from the power cables 102, 103 by a small air gap (e.g., ten or fewer centimeters) slightly reduces the delivered power.

While the maximum power received by the UAV 100 from the example power cables 102, 103 is 460 Watts, it is also important to confirm that such wattage is enough to support the operation of the UAV. Equation 5, below, represents the minimum power required for a UAV to hover:

$$P_{min} = \frac{1}{2\sqrt{\rho A}}(mg)^{3/2} \qquad \text{Equation 5}$$

In the example Equation 5, above, ρ represents the density of air (e.g., at sea level the density of air is approximately 1.2 kg/m$^3$); m represents the mass of the UAV 100 (inclusive of the payload 105), g represents the gravitational acceleration (e.g., 9.8 N/kg), and A represents the area of the rotors 110, 111, 112, 113. Assuming that the rotors 110, 111, 112, 113 have a radius of approximately 22.5 cm, the area of the four rotors of the UAV 100 is approximately 0.635 m$^2$ (as Area=4($\pi r^2$)). Solving Equation 5 for mass, assuming a $P_{min}$ of 460 Watts, an air density of 1.2 kg/m$^3$, a rotor area of 0.635 m$^2$, and a gravitational acceleration of 9.8 N/kg results in a mass of 8.8 kg (approximately 19.4 lb) that can be lifted only by the power received from the power cables 102, 103. In examples where the payload 105 is small (e.g., under 5 lbs), the UAV may be able to operate entirely off of power received from the power cables 102, 103 while the electrode assemblies 145, 155 are coupled to the power cables 102, 103. In some examples, the UAV 100 may even be able to charge a battery of the UAV while coupled to the power cables, thereby extending battery life of the UAV and/or facilitating travel away from the power cables 102, 103 (e.g., to complete a delivery that is not located near power cables).

Figure 4:
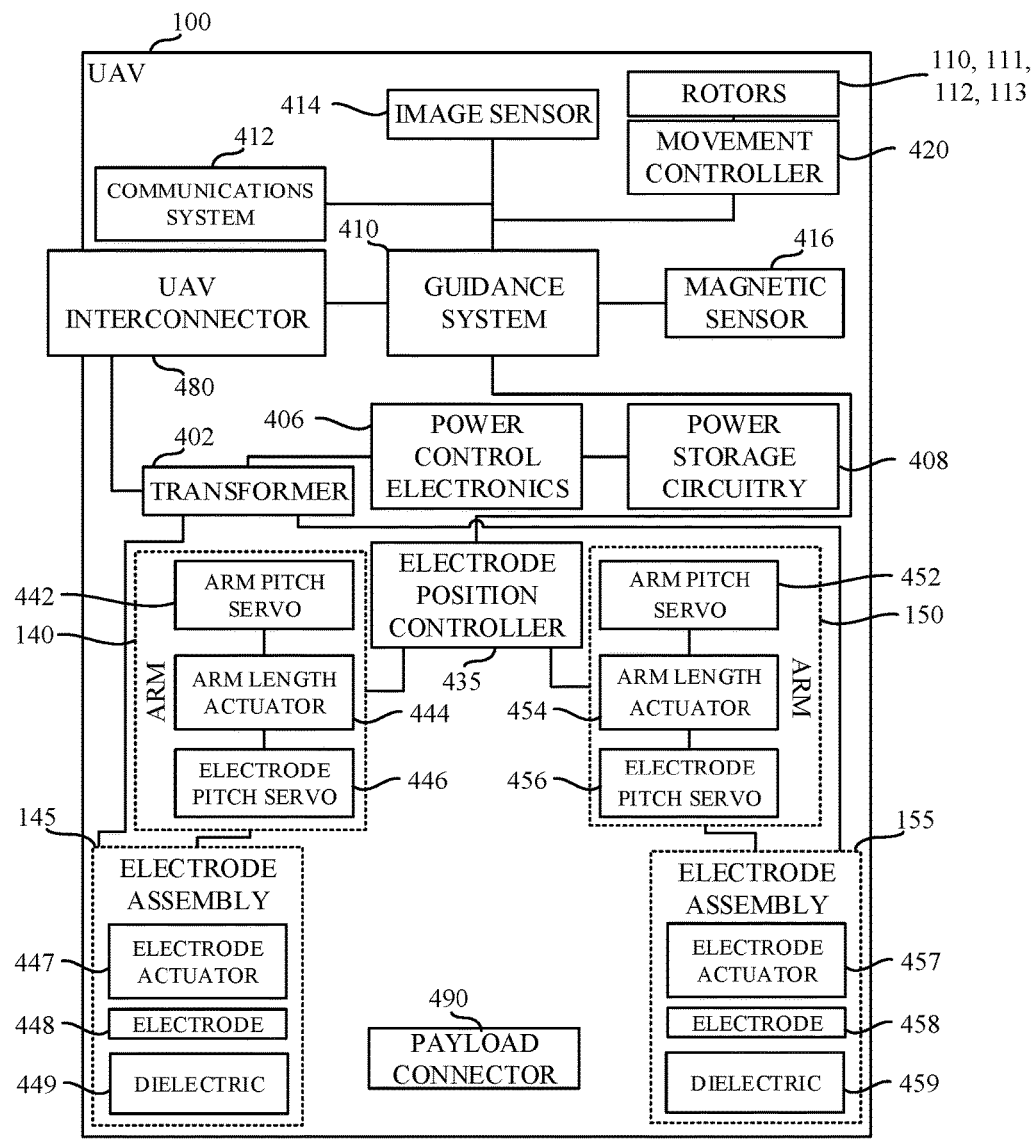
FIG. 4 is a block diagram representing an example implementation of the example UAV of FIG. 1.

FIG. 4 is a block diagram representing an example implementation of the example UAV 100 of FIG. 1. The example UAV 100 of FIG. 4 includes the first and second electrode assemblies 145 that are respectively coupled to the first and second arms 140, 150. The example UAV 100 of FIG. 4 includes a transformer 402 that is connected to the first and second electrode assemblies 145, 155. The example transformer 402 transforms an electrical signal received via the electrode assemblies 145, 155 and provides the transformed electrical signal to power control electronics 406, which store the received power in power storage circuitry 408. Movement of the UAV 100 is controlled by a guidance system 410. The example guidance system 410 communicates with external systems using a communications system 412. The example guidance system 410 receives inputs concerning surroundings of the UAV 100 via an image sensor 414 and a magnetic sensor 416. The guidance system 410 interacts with a movement controller 420, which operates the rotors 110, 111, 112, 113 to provide lift and/or directional control for the UAV 100. The example guidance system 410 communicates with an electrode position controller 435 to facilitate positioning of the first and second electrode assemblies 145, 155 via movement of the first and second arms 140, 150. In examples disclosed herein, the guidance system 410 communicates with a UAV interconnector 480 to enable interconnection of multiple UAVs. The example guidance system 410 utilizes a payload connector 490 to facilitate the UAV 100 picking up and dropping off a payload (e.g., the payload 105 of FIG. 1).

The example transformer 402 of the illustrated example of FIG. 4 transforms the high voltage AC signal received via the capacitively coupled electrodes 448, 458 to a transformed AC signal that can be used by the example power storage circuitry 408. In examples disclosed herein, the example transformer 402 is a step-down transformer. However, in some examples, the transformer may be a step-up transformer and/or the transformer 402 may be omitted entirely.

The example power control electronics 406 of the illustrated example of FIG. 4 converts the transformed AC signal received from the transformer 402 into DC power that can be used to charge the power storage circuitry 408 and/or operate the UAV 100 (e.g., to power the guidance system 410, to power the rotors 110, 111, 112, 113, etc.). In examples disclosed herein, the example power control electronics 406 are implemented by a rectifier and a regulator. However, any other approach to converting a received AC signal into DC power may additionally or alternatively be used.

The example power storage circuitry 408 of the illustrated example of FIG. 4 is implemented by a lithium ion battery. However, any other type of power storage circuitry may additionally or alternatively be used such as, for example, a nickel cadmium battery, a capacitor, etc. While a single power storage circuit 408 is shown in the illustrated example of FIG. 4, in some examples, multiple power storage circuits may additionally or alternatively be used.

The example guidance system 410 of the illustrated example of FIG. 4 receives navigation and/or delivery instructions from a central delivery control system (e.g., a dispatcher), and operates the UAV 100 according to the navigation and/or delivery instructions to retrieve a payload, travel to a destination, and deliver the payload at the destination. In examples disclosed herein, the example guidance system 410 communicates with the delivery control system via the communications system 412.

The example guidance system 410 receives input from the example image sensor 414 and the example magnetic sensor 416. Input from the example image sensor 414 may be used to, for example, determine when obstacles are to be avoided, determine a spacing between the power cables 102, 103 to facilitate positioning of the UAV 100 with respect to the power cables 102, 103, etc. Input from the example magnetic sensor 416 may be used by the example guidance system 410 to facilitate identification of the power cables 102, 103 (e.g., to confirm which power cables correspond to a same circuit, to confirm a type of the power cable, etc.).

Based on the navigation and/or delivery instructions received via the communications system 412, the image sensor 414, and/or the magnetic sensor 416, the example guidance system 410 controls operation of the example movement controller 420, the example electrode position controller 435, the example UAV interconnector 480, and/or the example payload connector 490. For example, the example guidance system 410 controls the operation of the movement controller 420 to instruct the movement controller 420 to power the rotors 110, 111, 112, 113, thereby lifting and/or maneuvering the UAV 100. The example guidance system 410 controls the electrode position controller 435 to position the electrode assemblies 145, 155 and/or, more particularly, the electrodes 448, 458, such that the electrodes 448, 458 are oriented correctly and/or extended for capacitive coupling with the power cables 102, 103. The example guidance system 410 controls operation of the UAV interconnector 480 to enable interconnection between the UAV 100 and a second UAV. As disclosed below in connection with FIGS. 6 and/or 7, interconnecting multiple UAVs enables the UAVs to capacitively couple to power cables 102, 103 that are spaced further apart than supported by a single UAV. The example guidance controller 410 controls operation of the example payload connector 490 to facilitate collection and/or delivery of a payload.

The example communications system 412 of the illustrated example of FIG. 4 is implemented by a wireless radio. In the illustrated example, the example communications system 412 communicates with the delivery control system using a cellular communication protocol such as, for example, code division multiple access (CDMA), WiMax, LTE, etc. However, any other past, present, and/or future communication protocol may additionally or alternatively be used such as, for example Wi-Fi, Bluetooth, etc. In some examples, the example communications system 412 communicates with the example delivery control system via a network such as, for example, the Internet. However, in some examples, the example communications system 412 may communicate directly with the example delivery control system. In some examples, the example communications system 412 may include multiple wireless radios to facilitate communication with the delivery control system and/or other nearby UAVs. In some examples, a long range communication system (e.g., a cellular radio) may be used for communicating with the delivery control system, while a shorter range communication system (e.g., WiFi, Bluetooth, etc.) may be used for communicating with the other nearby UAVs. Of course, the UAVs may communicate in any other fashion such as, for example, via a network (e.g., the Internet, a virtual private network (VPN), etc.), via the delivery control system, etc.

The example image sensor 414 of the illustrated example of FIG. 4 is implemented by an image sensing device such as, for example, a camera. However, any other type of image sensing device may additionally or alternatively be used such as, for example, a semiconductor charge coupled device (CCD) sensor, a complementary metal oxide semiconductor (CMOS) sensor, etc. In examples disclosed herein, the example image sensor 414 is forward facing with respect to the ordinary direction of travel of the UAV 100 (e.g., forward). Moreover, in the illustrated example of FIG. 4, a single image sensor is shown. However, in some examples, multiple image sensors 414 may be used and may be positioned at various locations around the body of the UAV. In some examples, two forward-facing image sensors are used to enable the guidance system 410 to utilize stereoscopic vision to navigate the UAV 100 (e.g., to facilitate accurate navigation with respect to the power cables 102, 103).

The example magnetic sensor 416 of the illustrated example of FIG. 4 measures a magnetic field created by power traveling through the cables 102, 103. The measurements taken by the example magnetic sensor 416 enable identification of power cables. In examples disclosed herein, the magnetic sensor is a microelectromechanical (MEMS) device for detecting and measuring magnetic fields. However, any other past, present, and/or future type(s) of magnetic sensor(s) may additionally or alternatively be used. In examples disclosed herein, the example magnetic sensor 416 enables differentiation between high voltage direct current (HVDC) transmission systems and alternating current (AC) transmission lines. In examples disclosed herein, the example magnetic sensor 416 is included in the body of the UAV 100. However, the example magnetic sensor 416 may be placed in any other location such as, for example, on the arm 140, 150, on the electrode assembly 145, 155, etc. In the illustrated example of FIG. 4, a single magnetic sensor 416 is shown. However, in some examples, multiple magnetic sensors 416 may additionally or alternatively be used. In some examples, the magnetic sensor(s) 416 is/are located on one or more of the electrode assemblies 145, 155 to facilitate measurement of the power cables 102, 103 within a close proximity without having to bring a body of the UAV 100 into close proximity of the power cables 102, 103.

The first example arm 140 of the illustrated example of FIG. 4 includes a first arm pitch servo 442, a first arm length actuator 444, and a first electrode pitch servo 446. The second example arm 150 of the illustrated example of FIG. 4 includes a second arm pitch servo 452, a second arm length actuator 454, and a second electrode pitch servo 456. The first example arm 140 and the second example arm 150 are rigid such that the arms 14, 150 can support the respective electrode assemblies 145, 155 separated by a distance matching the distance between the power cables 102, 103. However, any other approach to suspending the electrode assemblies 145, 155 from the UAV 100 may additionally or alternatively be used.

The first and second example arm pitch servos 442, 452 of the illustrated example of FIG. 4 control a pitch of the corresponding arm 140, 150 with respect to the UAV body 101. In the illustrated example of FIG. 4, the arm pitch servos 442, 452 are positional rotation servos. However, any other type(s) device(s) and/or combinations of devices may additionally or alternatively be used to control the pitch of the arms 140, 150 with respect to the UAV body 101.

As shown in connection with FIG. 1, the first example arm pitch servo 442 enables the first arm 140 to rotate about a first axis at the first interconnection 142 with the UAV body 101. Likewise, the second example arm pitch servo 452 enables the second arm to rotate about a second axis at a second interconnection with the UAV body 101. In examples disclosed herein, the pitch is adjustable by the arm pitch servos 442, 452 such that the corresponding arm 140, 150 may be positioned at any angle with respect to the body of the UAV that does not interfere with operation of the UAV (e.g., such that the arm does not impede rotation of a rotor, such that the arm position does not alter the center of balance of the UAV such that flight becomes unstable, etc.).

The first and second example arm length actuators 444, 454 of the illustrated example of FIG. 4 control the length of the corresponding arm 140, 150. The length of the arms 140, 150 may be adjusted to, for example, control the distance between the electrode assemblies 145, 155 (e.g., to make the distance between the electrode assemblies 145, 155 match the distance between the power cables 102, 103, to position the electrode assemblies 145, 155 such that they are coupled to the corresponding power cables 102, 103.)

The first and second example arm length actuators 444, 454 of the illustrated example of FIG. 4 are implemented by linear actuators. However, first and second example arm length actuators 444, 454 may be implemented by any other type(s) and/or combination of type(s) of devices for adjusting a length of the corresponding arm 140, 150. Moreover, in the illustrated example of FIG. 4, each arm 140, 150 includes a single arm length actuator 444, 454. However, any number of arm length actuators may additionally or alternatively be used. In some examples, the arm length actuators may be omitted, and the distance between the electrode assemblies may be controlled based on the positions of the arm pitch actuators 442, 452.

The first and second example arm length actuators 444, 454 of the illustrated example of FIG. 4 are operated independently. That is, the length of the first arm 140 need not match the length of the second arm 150. In some examples, such as in the illustrated example of FIG. 1, the arms 140, 150 may be the same length. However, in some other examples, such as in the illustrated example of FIG. 8 (described below), the arms 140, 150 may be set to different lengths.

The first and second example electrode pitch servos 446, 456 of the illustrated example of FIG. 4 control a pitch of the corresponding electrode assembly 145, 155 with respect to the corresponding arm 140, 150. In the illustrated example of FIG. 4, the electrode pitch servos 446, 456 are positional rotation servos. However, any other type(s) device(s) and/or combinations of devices may additionally or alternatively be used to control the pitch of the electrode assemblies 145, 155 with respect to the arms 140, 150.

As shown in connection with FIG. 1, the first example electrode pitch servo 446 enables the first electrode assembly 145 to be rotated about a third axis at a third interconnection between the first electrode assembly 145 and the first arm 140. Likewise, the second example electrode pitch servo 456 enables the second electrode assembly 155 to be rotated about a fourth axis at a fourth interconnection between the second electrode assembly 155 and the second arm 150. In examples disclosed herein, the pitch is adjustable by the electrode pitch servos 446, 456 such that the corresponding electrode assembly 145, 155 may be positioned for alignment with the corresponding power cable 102, 103.

In examples disclosed herein, the electrode pitch servo 446, 456 operate with a single degree of freedom (e.g., one axis). However, in some examples, the electrode pitch servo 446, 456 may operate with multiple degrees of freedom to, for example, turn the electrode assembly 145, 155 with respect to the UAV body 101, elevate a front of the electrode assembly 145, 155, etc. Using multiple degrees of freedom may facilitate better capacitive coupling of the electrode assemblies 145, 155 with the power cables 102, 103 (e.g., greater capacitances).

The first example electrode assembly 145 of the illustrated example of FIG. 4 includes a first electrode actuator 447, a first electrode 448, and a first dielectric 449. The second example electrode assembly 155 of the illustrated example of FIG. 4 includes a second electrode actuator 457, a second electrode 458, and a second dielectric 459.

The first and second example electrode actuators 447, 457 of the illustrated example of FIG. 4 can be controlled to adjust the length of the electrode assembly 145 is adjustable by use of the electrode actuator 320. As a result, the length L of the electrode assembly 145 can be controlled during operation of the UAV 100 (e.g., during flight). In examples disclosed herein, the electrode actuator 320 is implemented using a linear actuator. However, any other approach to controlling a length of the electrode may additionally or alternatively be used.

The first and second example electrodes 448, 458 of the illustrated example of FIG. 4 are implemented by copper plates. However, any other electrically conductive material and/or electrode structure may additionally or alternatively be used. For example, the electrode may be a cylindrical structure (e.g., a wire) and/or may be made of graphite. In examples disclosed herein, the electrodes 448, 458 are electrically connected to the transformer 402 via one or more wires (e.g., a wire connected to and/or embedded in the example arm 140, 150).

The first and second example dielectrics 449, 459 of the illustrated example of FIG. 4 are positioned intermediate the corresponding first and second electrodes 448, 458 and the corresponding first and second power cables 102, 103. In examples disclosed herein, the example dielectrics 449, 459 are made of Teflon. However, any other dielectric material may additionally or alternatively be used. In examples disclosed herein, the example dielectrics 449, 459 are four centimeters thick, and cover an entire bottom surface of the corresponding electrode 448, 458. However, any other thickness may additionally or alternatively be used. Moreover, any other amount of the example electrodes 448, 458 may be covered by the example dielectric 449, 459. In examples disclosed herein, the example dielectric 449, 459 is made of a single material. However, in some examples, multiple materials may additionally or alternatively be used.

The electrode position controller 435 of the illustrated example of FIG. 4 controls operation of the first and second example arm pitch servos 442, 452; operation of the first and second example arm length actuators 444, 454; operation of the first and second example electrode pitch servos 446, 456; and operation of the first and second example electrode actuators 447, 457 to control the position of the first and second example electrodes 448, 458 and/or the first and second example dielectrics 449, 459. In examples disclosed herein, the example electrode position controller 435 communicates one or more electrical signals to each of the example arm pitch servos 442, 452, the example arm length actuators 444, 454, the example electrode pitch servos 446, 456, the example electrode actuators 447, 457. However, any other type(s) of control signal(s) may additionally or alternatively be used. For example, if the example arm length actuators 444, 454 were implemented using pneumatic pistons, the example electrode position controller 435 may supply pneumatic pressure to operate the example arm length actuators 444, 454.

The example UAV interconnector 480 of the illustrated example of FIG. 4 enables the UAV 100 to become electrically interconnected with one or more other UAVs. Interconnecting with another UAV enables the interconnected UAVs to position electrode assemblies apart by a distance greater than the distance supported by a single UAV (e.g., wider than the arms 140, 150 can position the electrode assemblies 145, 155. In examples disclosed herein, the example UAV interconnector 480 is implemented by a wire with a magnetic coupling terminal. The magnetic coupling terminal of a first UAV interconnector magnetically couples to a second magnetic coupling terminal of a second UAV interconnector, thereby enabling the first wire of the first UAV interconnector to become electrically coupled to a second wire of a second UAV interconnector. In examples disclosed herein, the wire is flexible. However, in some examples the wire may be rigid and/or include rigid sections. Using rigid sections may facilitate easier interconnection of the wires between two UAVs (which may couple to each other during flight).

The example payload connector 490 of the illustrated example of FIG. 4 enables the UAV 100 to grab and release a payload. In examples disclosed herein, the payload connector 490 is implemented by a clamp that can be operated to close (e.g., to grab the payload) or open (e.g., to release the payload). However, any other approach to connecting the payload to the UAV may additionally or alternatively be used.

Figure 5:
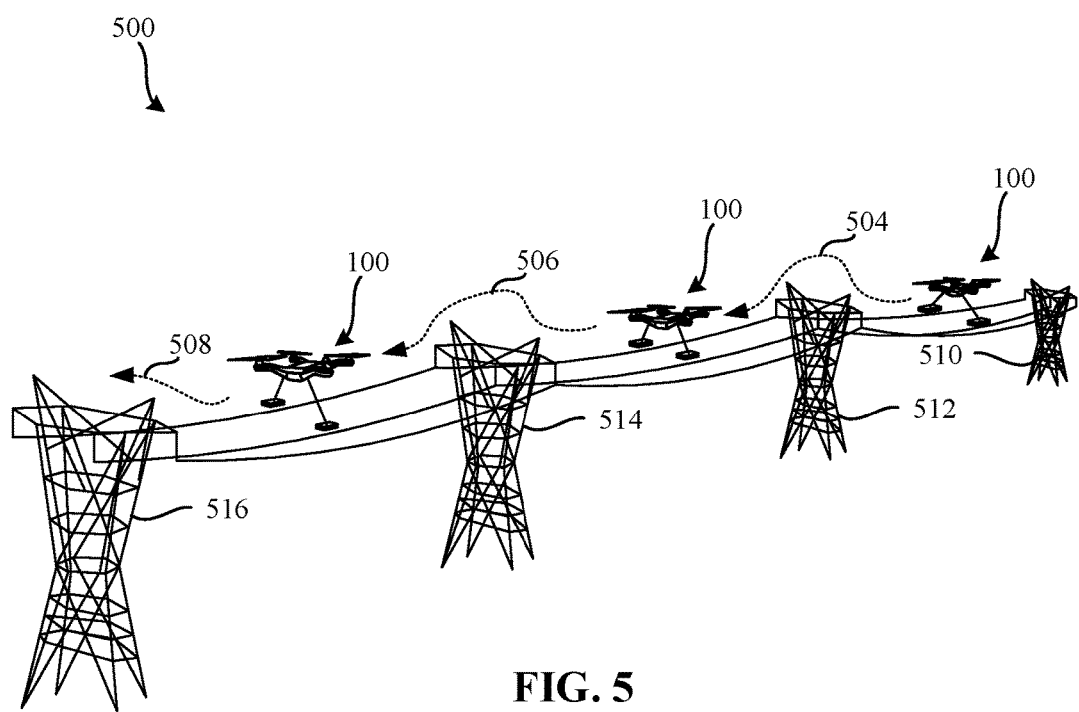
FIG. 5 is an example path of the UAV of FIG. 1 within an example environment of use.

FIG. 5 is an example path of the UAV of FIG. 1 within an example environment of use 500. In the example environment of use 500, the power cables along which the UAV 100 is to travel are suspended by towers 510, 512, 514, 516. Such towers 510, 512, 514, 516 are considered obstacles and are to be avoided by the drone. Along a flight path (beginning at the right of the illustrated example of FIG. 5), the UAV 100 may detect an obstacle (e.g., the tower 512), and perform an obstacle avoidance maneuver 504 to ensure that the UAV 100 and/or the extremities of the UAV (e.g., the rotors, the electrode assemblies, the arms, the UAV interconnector, etc.) does not collide with the obstacle (e.g., the tower 512). In examples disclosed herein, obstacles may be detected via, for example, the image sensor 414. In examples disclosed herein, performance of the example obstacle avoidance maneuver 504 may involve de-coupling from the power cables. While de-coupled, the UAV 100 may operate using energy stored in the power storage circuitry 408. Upon completion of the example obstacle avoidance maneuver 504, the UAV 100 may then re-couple with the power cables, and may utilize power received from the power cables (in whole or in part) to operate the UAV 100. Along the flight path, the UAV 100 may then perform subsequent obstacle avoidance maneuvers 506, 508 to avoid subsequent obstacles (e.g., the towers 514, 516). While in the illustrated example of FIG. 5, the obstacles are illustrated as towers, in practice, many other obstacles may be encountered such as, for example, tree limbs, wildlife (e.g., birds resting on the power lines and/or flying within the path of the UAV, squirrels traveling on the power lines, etc.), other UAVs, etc.

Figure 6:
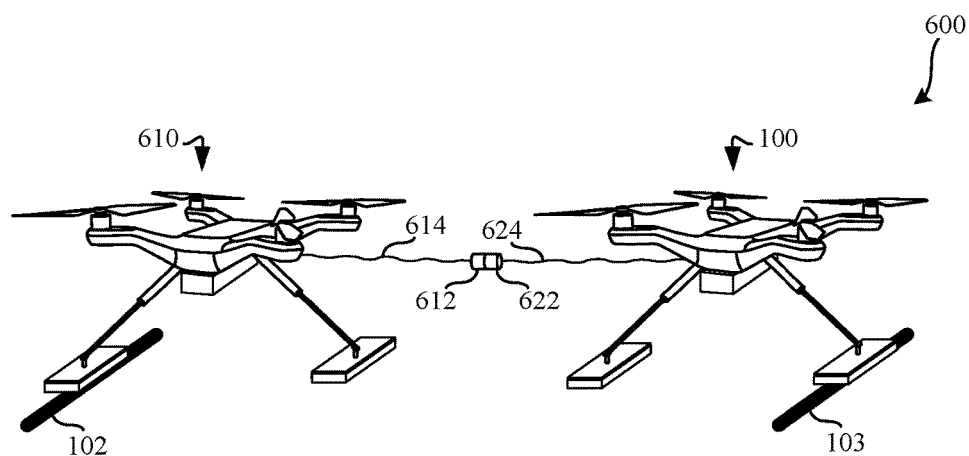
FIGS. 6 & 7 are illustrations of the example UAV of FIG. 1 interconnecting with a second UAV to facilitate capacitive coupling to power cables that are a greater distance apart than can be used by a single UAV.
Figure 7:
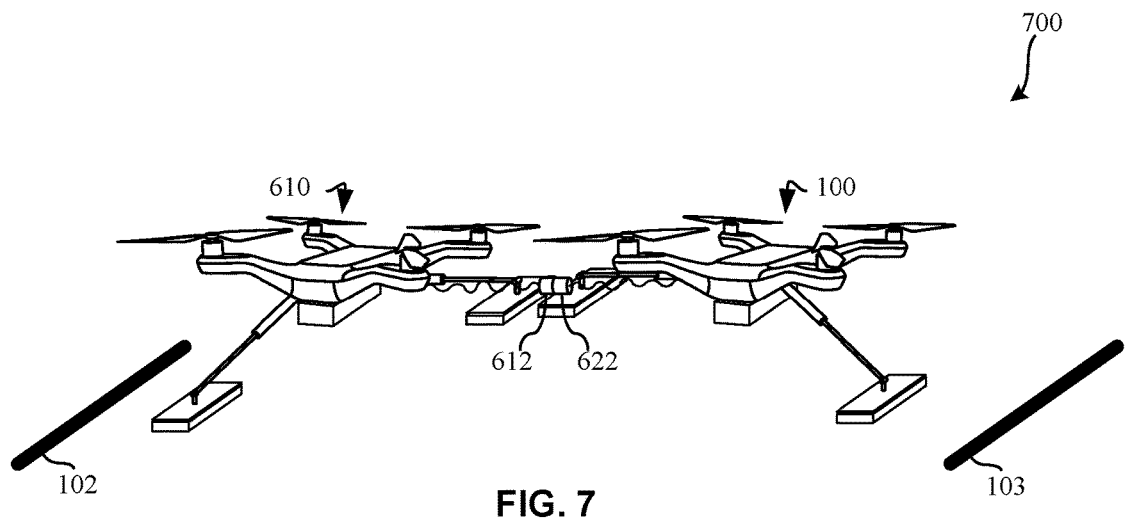

FIGS. 6 & 7 are illustrations of the example UAV 100 of FIG. 1 interconnecting with a second UAV 610 to facilitate capacitive coupling to power cables 102, 103 that are a greater distance apart that can be used by a single UAV. FIG. 6 illustrates an example interconnection configuration 600. In the illustrated example of FIG. 6, two UAVs 100, 610 operate while interconnected via wires 614, 624. In the illustrated example of FIG. 6, the wires 614, 624, are electrically connected via magnetic coupling terminals 612, 622. The example magnetic coupling terminals 612, 622 hold the wires 614, 624 in electrical connection with each other and may separate the wires 614, 624 if, for example, an obstacle is encountered, the UAVs become separated by a distance greater than the length of the wires, etc.

FIG. 7 illustrates an example interconnection configuration 700. In the illustrated example of FIG. 7, before each of the UAVs 100, 610 navigates to position a respective electrode assembly over a respective power cable, the UAVs 100, 610 approach each other to connect the magnetic coupling terminals 612, 622. In the illustrated example of FIG. 7, the magnetic coupling terminals 612, 622 are supported by the arms and/or electrode assemblies of the respective UAVs.

In the illustrated examples of FIGS. 6 and/or 7, the wires 614, 624 are suspended from the body of the UAVs 100, 610. However, the wires 614, 624 may be interconnected from the UAVs in any other fashion. For example, the wires interconnect the electrodes of the electrode assemblies that are not to be positioned over respective power cables.

Figure 8:
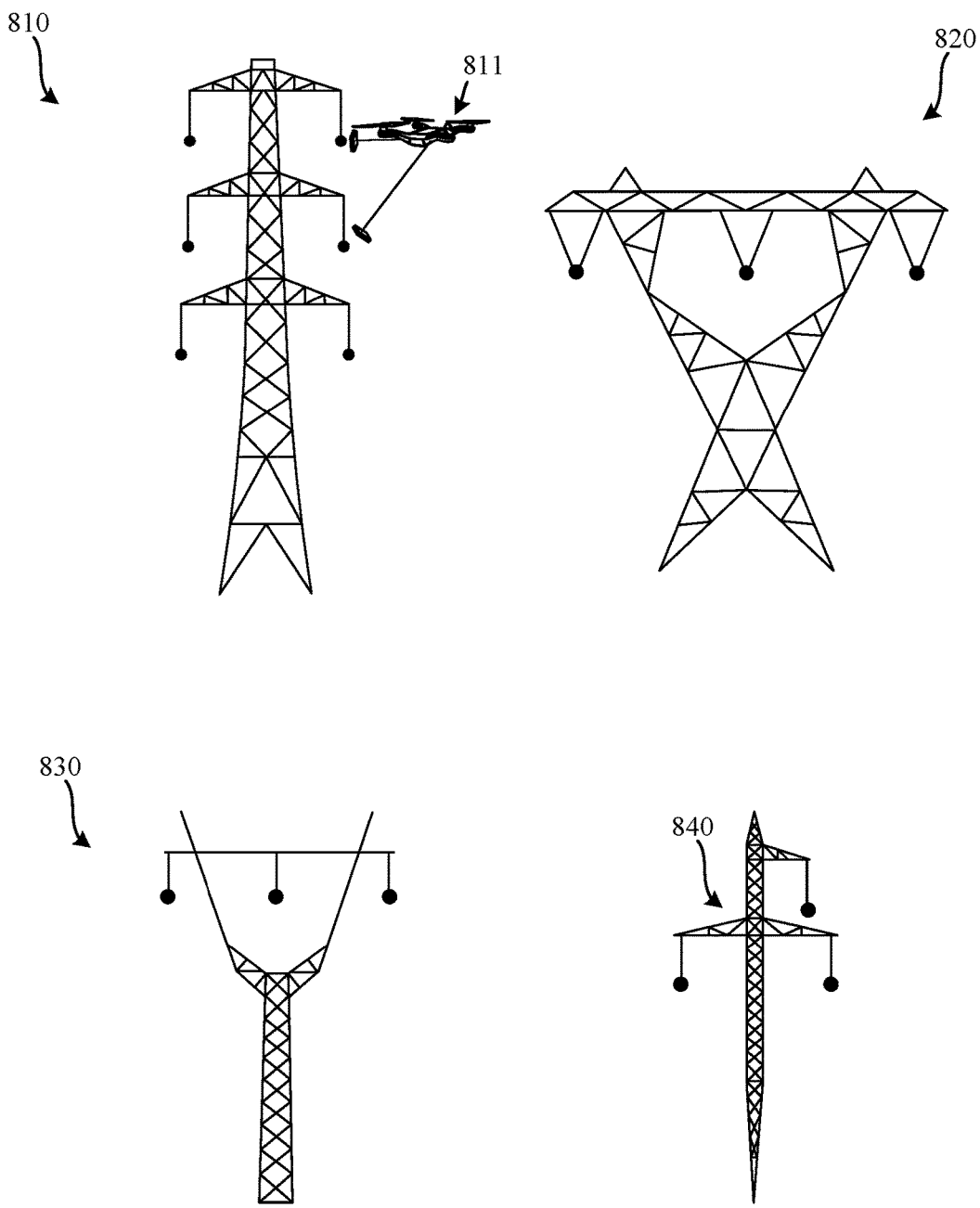
FIG. 8 illustrates overhead power transmission towers to which the example UAV of FIG. 1 may become wirelessly coupled.

FIG. 8 illustrates overhead power transmission towers carrying power cables to which the example UAV 100 of FIG. 1 may become wirelessly coupled. In the illustrated example of FIG. 8, four different power transmission tower configurations 810, 820, 830, 840 are shown. In the illustrated example of FIG. 8, a first configuration 810 includes six power cables carrying two separate three-phase transmission circuits. In such an example, the UAV first identifies two phases (e.g., two power cables) within the same three-phase transmission circuit, and then couples to those phases. To facilitate such identification, the UAV may use the magnetic sensor 416 to detect active cables along the same circuit for coupling. In some examples, the magnetic sensor 416 can also be used to differentiate between high voltage DC systems and alternating current transmission.

When coupling to the power cables supported by the power transmission towers, the UAV 100 may arrange the electrode assemblies in a variety of different fashions. In some examples, the electrode assemblies are configured such that they are horizontal (e.g., parallel to the ground). However, in some examples, the electrode assemblies might not be configured such that they are horizontal (e.g., parallel to the ground). For example, in some configurations, the electrode assemblies may be configured to be vertical (e.g., perpendicular to the ground), and/or slanted (e.g., at an angle intermediate 0° and 90° with respect to the ground). In the illustrated example of FIG. 8, an example UAV 811 is shown with its electrode assemblies configured in a vertical and slanted configuration to enable coupling with the first example power transmission tower 810. In some examples, the UAV 811 might connect to a second UAV as described in connection with FIGS. 6 and/or 7 to facilitate coupling of two phases of the circuit.

While an example manner of implementing the example UAV 100 of FIG. 1 is illustrated in FIG. 4, one or more of the elements, processes and/or devices illustrated in FIG. 4 may be combined, divided, re-arranged, omitted, eliminated and/or implemented in any other way. Further, the example guidance system 410, the example communications system 412, the example image sensor 414, the example magnetic sensor 416, the example movement controller 420, the example electrode position controller, the example UAV interconnector 480, the example payload connector 490, and/or, more generally, the example UAV 100 of FIGS. 1 and/or 4 may be implemented by hardware, software, firmware and/or any combination of hardware, software and/or firmware. Thus, for example, any of the example guidance system 410, the example communications system 412, the example image sensor 414, the example magnetic sensor 416, the example movement controller 420, the example electrode position controller, the example UAV interconnector 480, the example payload connector 490, and/or, more generally, the example UAV 100 of FIGS. 1 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example guidance system 410, the example communications system 412, the example image sensor 414, the example magnetic sensor 416, the example movement controller 420, the example electrode position controller, the example UAV interconnector 480, the example payload connector 490, and/or, more generally, the example UAV 100 of FIGS. 1 and/or 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example UAV 100 of FIGS. 1 and/or 4 may include one or more elements, processes and/or devices in addition to, or instead of, those illustrated in FIG. 4, and/or may include more than one of any or all of the illustrated elements, processes and devices.

Figure 9:
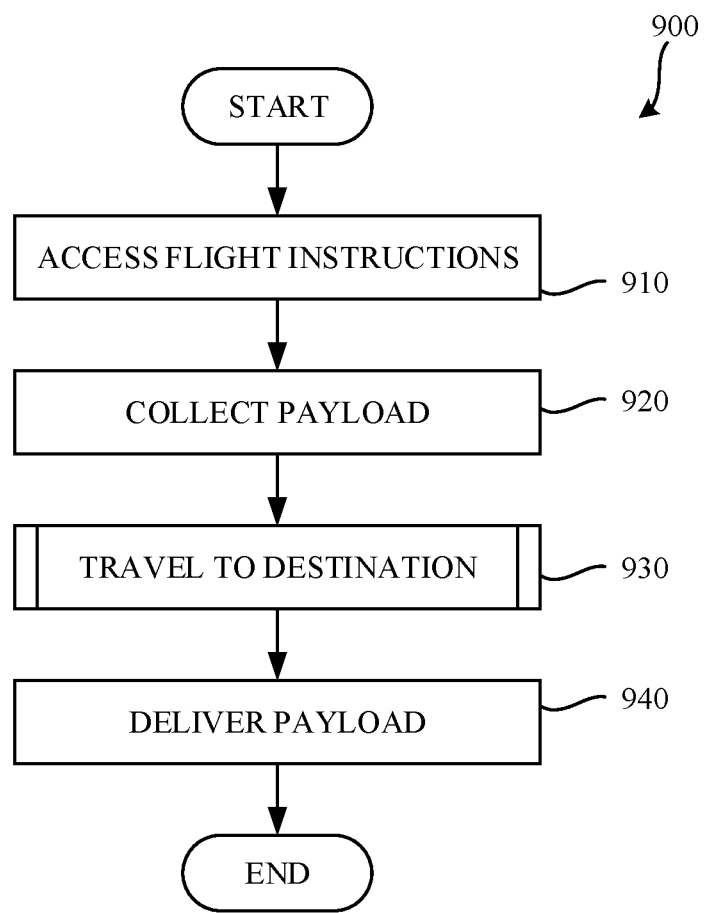
FIG. 9 is a flowchart representative of example machine-readable instructions that, when executed, may cause the UAV of FIG. 1 to deliver a payload.
Figure 10:
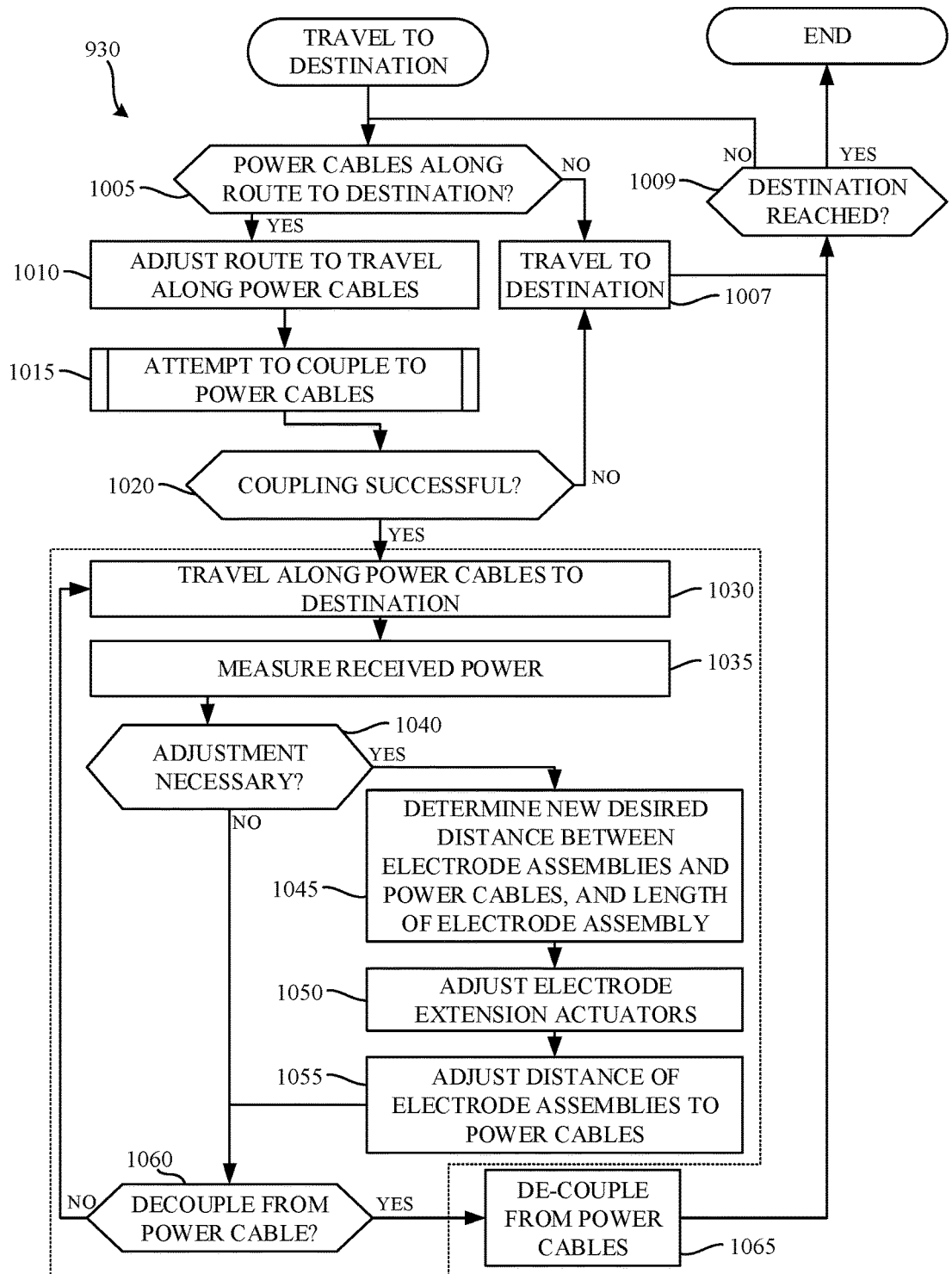
FIG. 10 is a flowchart representative of example machine-readable instructions that, when executed, may cause the UAV of FIG. 1 to travel to a destination.

Flowcharts representative of example machine readable instructions for implementing the example UAV 100 of FIGS. 1 and/or 4 are shown in FIGS. 9, 10, and/or 11. In these examples, the machine readable instructions comprise a program(s) for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart(s) illustrated in FIGS. 9, 10, and/or 11, many other methods of implementing the example UAV 100 may alternatively be used. For example, the order of execution of the blocks may be changed, and/or some of the blocks described may be changed, eliminated, or combined.

As mentioned above, the example processes of FIGS. 9, 10, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9, 10, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 is a flowchart representative of example machine-readable instructions that, when executed, may cause the UAV 100 of FIG. 1 to deliver a payload. The example program 900 of FIG. 9 begins when the example guidance system 410 accesses flight instructions via the communication system 412 (block 910). In the illustrated example of FIG. 9, the flight instructions are transmitted to the guidance system 410 from a central delivery control system. However, in some examples the guidance system 410 may contact the delivery control system via the communication system 412 to, for example, query whether any flight instructions are available, to determine whether any nearby UAVs require interconnection to facilitate coupling with power cables, etc.

The example guidance system 410 instructs the movement controller 420 to operate the rotors 110, 111, 112, 113 to move the UAV 100 to the payload. The example payload collector 490 collects the payload (block 920). The UAV 100 is then operated to travel to the destination specified in the flight instructions (block 930). An example approach for traveling to the destination is described in the illustrated example of FIG. 10, below. Upon reaching the destination, the example payload connector 490 delivers the payload (block 940). In some examples, the example process of FIG. 9 is then repeated to, for example, collect and deliver additional payloads. However, in some examples, no additional payloads may be available upon completion of the delivery. In such an example, the guidance system 410 may operate the UAV 100 to return it to a centralized location such as, for example, a payload pick-up center where additional payloads are expected to be collected.

FIG. 10 is a flowchart representative of example machine-readable instructions that, when executed, may cause the UAV 100 of FIG. 1 to travel to a destination. The example program 930 the illustrated example of FIG. 10 begins when the guidance system 410 determines that the collection of the payload 105 (block 920) is complete. The example guidance system 410 determines whether power cables are present along the route to the destination specified in the flight instructions (block 1005). In examples disclosed herein, the example guidance system 410 may determine whether power cables are present along the route to the destination by consulting a map (e.g., a map stored in a memory of the UAV 100, a map retrieved from a central delivery system via the communication system 412, etc.). However, in some other examples, the example guidance system 410 may determine whether power cables are present along the route to the destination via the image sensor 414 by, for example, processing an image from the image sensor 414 to determine whether a structure resembling power cables is present. If no power cables are present along the route to the destination (e.g., block 1005 returns a result of NO), the example guidance system 410 controls the movement controller 420 to operate the rotors 110, 111, 112, 113 and move the UAV 100 to the destination (e.g., without coupling to power cables) (block 1007).

While in-route to the destination, the example guidance system 410 continues to determine whether there are power cables along the route to the destination (e.g., the process of blocks 1005, 1007, and 1009 is repeated until power cables are identified or the destination is reached). If for example while traveling towards the destination, the example guidance system identifies the power cables are present, coupling with the power cables may be beneficial in that it may provide power to the UAV 100 (even for a limited amount of time). Such power received from the power cables 102, 103 reduces the amount of power utilized from the power storage circuitry 408, thereby extending the range of the UAV 100.

If the example guidance system 410 identifies power cables 102, 103 along the route to the destination (e.g., block 1005 returns a result of YES), the example guidance system 410 adjusts the route such that they UAV 100 will travel along the power cables 102, 103 (block 1010). The UAV 100 attempts to couple to the power cables 102, 103 (block 1015). Coupling is accomplished by, for example, positioning the electrode assemblies 145, 155 within proximity of the power cables 102, 103. An example approach to attempting to couple to the power cables is described in connection with FIG. 11, below.

The example guidance system 410 determines whether the attempt to couple to the power cables was successful (block 1020). In the illustrated example of FIG. 10, the example guidance system 410 determines whether the attempt to couple to the power cables was successful by measuring an amount of power received at the power control electronics 406. However, any other approach to determining whether the coupling was successful may additionally or alternatively be used such as, for example, inspecting an image received from the image sensor 414 to determine if the electrode assemblies 145, 155 are within close proximity of the power cables 102, 103, etc. If the coupling was not successful (e.g., block 1020 returns a result of NO), the example guidance system 410 instructs the movement controller 420 to cause the UAV 100 to travel to the destination (e.g., without having coupled to the power cables) (block 1007). The coupling attempt may be unsuccessful for a variety of reasons such as, for example, no power is received, the power cables are too far apart and no nearby UAVs are available for interconnection, conditions are too dangerous to safely approach the power cables (e.g., high winds, rain, etc.). In some examples, the coupling may be re-attempted up to a threshold number of times before the coupling is considered to be unsuccessful (e.g., two coupling attempts, three coupling attempts, five coupling attempts, etc.).

If the attempted coupling was successful (e.g., block 1020 returns a result of YES), the example guidance system 410 instructs the movement controller 420 to cause the UAV 100 to travel along the power cables 102, 103 to the destination (block 1030). While coupled, the example guidance system 410 measures the power received from the power cables 102, 103 (block 1035). Examples disclosed herein, the guidance system measures the received power by interfacing with the power control electronics 406. The example guidance system 410 determines whether an adjustment is necessary based on the received power (block 1040). Adjustment may be necessary when, for example, an amount of received power is too low (e.g., the UAV 100 is flying too far from the power cables 102, 103), an amount of power received is too great (e.g., the UAV 100 is flying too close to the power cables 102, 103).

If the example guidance system 410 determines that an adjustment is necessary (e.g., block 1040 returns result of YES), the example guidance system 410 determines a new desired distance between the electrode assemblies 145, 155 and power cables 102, 103 and a new desired length of the electrode assemblies 145, 155 (block 1045). The desired distance and/or the desired length may be calculated by the example guidance system 410 based on, for example, the example equation 1, the example equation 2, the example equation 3, and/or the example equation 4 disclosed above. In some examples, the equations might not be used determine the new desired distance and, instead, the example guidance system 410 may approximate a new desired distance based on the amount of power received compared to, for example, an amount of power consumed to operate the UAV 100.

The example electrode position controller 435 adjusts the electrode actuators 447, 457 to extend or retract the example electrodes 448, 458 (block 1050). As described above, extending and/or retracting the example electrodes 448, 458 respectively increases or decreases the capacitance between the example electrodes 448, 458 and their corresponding power cables 102, 103. As shown in the example equation 1, above, controlling the capacitance has a direct relation to the amount of power that can be received via the capacitive coupling.

The example electrode position controller 435 operates the example arm pitch servo 442, 452, the example arm length actuators 444, 454, and/or the example electrode pitch servo 446, 456 to adjust the distance between the electrode assemblies 145, 155 (and/or more particularly, the electrodes 448, 458) and the power cables 102, 103 (block 1055). Additionally or alternatively, the distance between the electrode assemblies 145, 155 and their respective power cables 102, 103 may be controlled via the movement controller 420 by, for example, causing the UAV 100 to move away from the power cables 102, 103 (e.g., to increase the distance, thereby reducing the capacitance), or to approach the power cables 102, 103 (e.g., to reduce the distance, thereby increasing the capacitance). As described above in connection with the example equation 1, controlling the distance between the electrodes 448, 458 and the power cables 102, 103 affects the capacitance between the electrodes 448, 458, and their respective power cables 102, 103.

Upon adjusting the distance (block 1055) and/or determining that no adjustment was necessary (e.g., block 1040 returning result of NO), the example guidance system 410 determines whether the UAV 100 should decouple from the power cables 102, 103 (block 1060). The example guidance system 410 may determine that the UAV 100 is to decouple from the example power cables 102, 103 when, for example, an obstacle is identified, the destination is reached, continuing to travel along the power cables would cause the UAV 100 to travel away from the destination, the power cables are terminated, etc. If the example guidance system 410 determines that the UAV 100 is not to decouple from the power cables 102, 103 (e.g., block 1060 returns a result of NO), the example process of blocks 1030 through 1060 is repeated until the example guidance system 410 determines that the UAV 100 is to decouple from the power cables 102, 103.

Upon determining that the UAV 100 is to decouple from the power cables 102, 103, the example guidance system 410 instructs the movement controller 420 to decouple the UAV 100 from the power cables 102, 103 (block 1065). In examples disclosed herein, the UAV 100 is decoupled from power cables 102, 103 by ascending away from the power cables 102, 103. However, the UAV 100 may be decoupled from power cables 102, 103 in any other fashion. The example guidance system 410 determines whether the destination has been reached (block 1009). In some examples, after decoupling from the power cables 102, 103, the UAV 100 may travel along a last leg of the route that might not include power cables (e.g., between the power cables 102, 103 and a home of an intended recipient of the payload).

Figure 11:
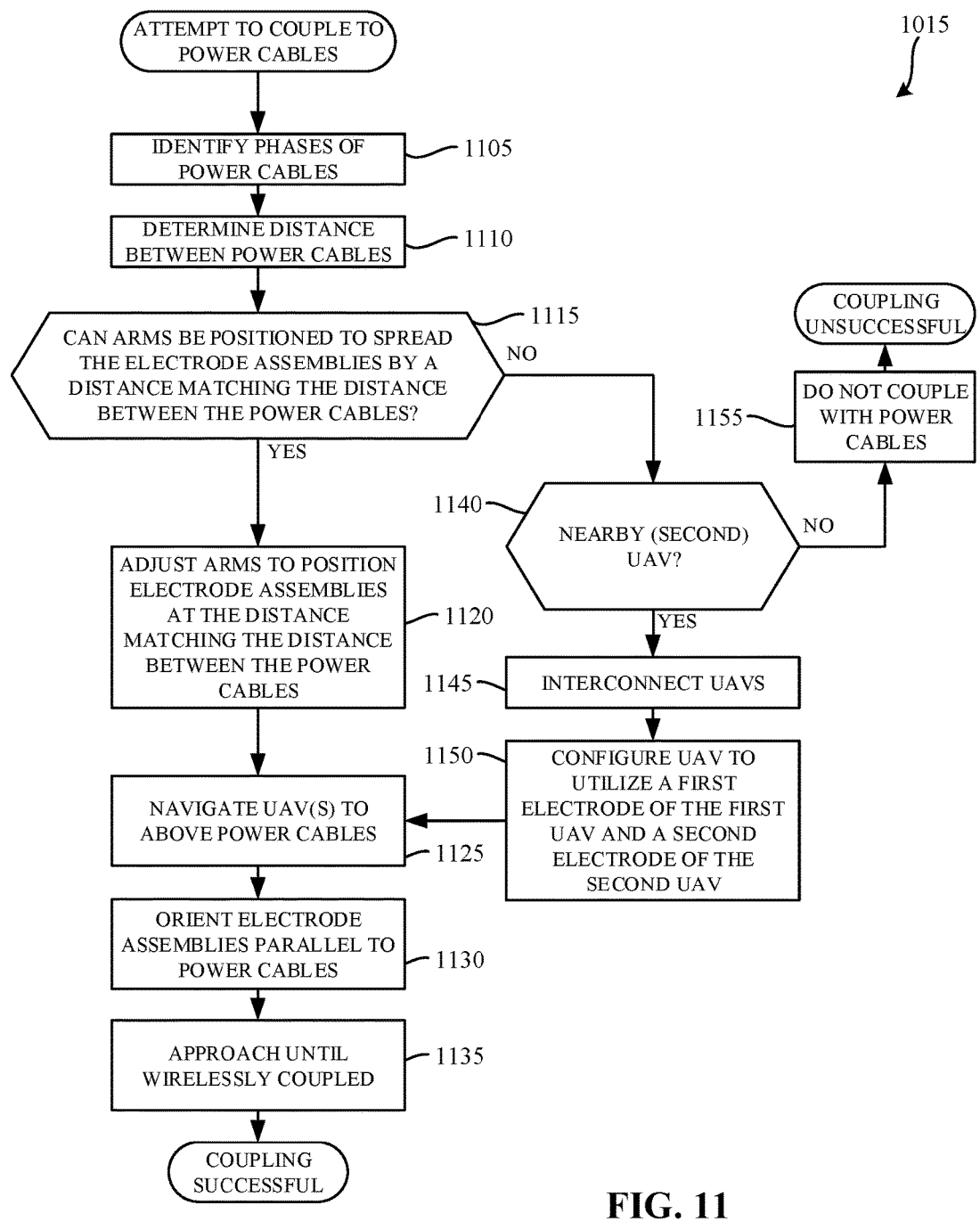
FIG. 11 is a flowchart representative of example machine-readable instructions that, when executed, may cause the UAV of FIG. 1 to attempt to couple to power cables.

FIG. 11 is a flowchart representative of example machine-readable instructions that, when executed, may cause the UAV 100 of FIG. 1 to attempt to couple to power cables 102, 103. The example program 1015 of FIG. 11 begins when the example guidance system 410, via an input received from the example magnetic sensor 416, identifies phases of the power cables 102, 103 (block 1105). In some examples, a tower may carry multiple three-phase power circuits. Identifying and coupling to two phases of the same circuit ensures that power will be received via the capacitive coupling.

The example guidance system 410, via an input received from the image sensor 414, determines a distance between the power cables 102, 103 (block 1110). In some examples, the distance between the power cables 102, 103 may be determined based on, for example, a lookup based on the present location of the UAV 100. For example, a power distribution system within a region may utilize a same separation between all power cables such that information concerning the distance between the power cables 102, 103 may be queried from an external data source (e.g., the delivery control system). In some examples, the information concerning the distance between the power cables 102, 103 may be included in the flight instructions accessed in connection with block 910 of FIG. 9. In some examples, image sensor 414 may be utilized to determine the distance as, while a power distribution system may attempt to utilize a same separation and/or distances between power cables along a route may be known, minor variations and/or deviations from the standard and/or documented distances can be reasonably anticipated. In some examples, the distance between the power cables 102, 103 may be determined by reading information from a data source that is physically proximate to the UAV. For example, information concerning the distance between the power cables 102, 103 may be read from a radio frequency identification (RFID) tag (e.g., an RFID tag placed on a tower of the power distribution system and/or any other location that that can be read by an RFID sensor of the UAV), a Quick Response (QR) code placed on a tower of the power distribution system and/or any other location visible to the image sensor 414 of the UAV, etc.

The example electrode position controller 435 determines whether the arms 140, 150 can be positioned to spread the electrode assemblies 145, 155 by a distance matching the identified distance between the power cables 102, 103 (block 1115). In some examples, the arms 140, 150, may be able to space the electrode assemblies 145, 155 apart by, for example, six feet. However, if the power cables 102, 103 are separated by ten feet, the UAV 100 will likely not be able to couple the electrode assemblies 145, 155 to the power cables 102, 103. While in examples disclosed herein, the electrode assemblies 145, 155 are spread apart by a distance matching the distance between the power cables 102, 103, any other distance may additionally or alternatively be used. For example, a distance different than the distance between the power cables 102, 103 might be used when the electrode assemblies are not positioned directly above the power cables 102, 103 (e.g., as shown in the illustrated example of FIG. 8).

If the arms 140, 150 can be positioned to spread the electrode assemblies 145, 155 to a distance matching the distance between the power cables 102, 103 (Block 1115 returns a result of YES), the example electrode position controller 435 adjusts the arms 140, 150 to position the electrode assemblies at the distance matching the distance between the power cables 102, 103 (block 1120). In examples disclosed herein, the arms 140, 150 are adjusted by controlling the example arm pitch servos 442, 452, the example arm length actuators 444, 454, and/or the example electrode pitch servos 446, 456.

The example guidance system 410 navigates the UAV 100 to a location above the power cables 102, 103 (block 1125). In examples disclosed herein, the location above the power cables 102, 103 is determined such that when moving to the location above the power cables 102, 103, the UAV 100 does not risk colliding with the power cables 102, 103 (or any other obstacles). In examples disclosed herein, the example location above the power cables 102, 103 is far enough away from the power cables 102, 103 that the electrode assemblies are not capacitively coupled (e.g., less than 1 pF of capacitance exists between an electrode assembly and the cable). While in examples disclosed herein, the location is above the power cables 102, 103, any other location may additionally or alternatively be used such as, for example, to the side of the power cables, below the power cables, etc.

The example guidance system 410 orients the electrode assemblies 145, 155 such that they are parallel to the power cables 102, 103 (block 1130). In examples disclosed herein, the example guidance system 410 orients the electrode assemblies 145, 155 by interfacing with the movement controller 420 to turn the UAV 100. However, any other approach to orienting the electrode assemblies 145, 155 parallel to the power cables 102, 103 may additionally or alternatively be used. For example, the example electrode pitch servos 446, 456 may operate with multiple degrees of freedom such that the electrode assemblies 145, 155 can be rotated with respect to the corresponding arm 140, 150 and aligned in parallel with the power cables 102, 103.

The example guidance system 410 then directs the movement controller to approach the power cables 102, 103 until the electrode assemblies 145, 155 become capacitively coupled to the power cables 102, 103 (e.g., until a measurable amount of power is received) (block 1135). Upon completion of the capacitive coupling, the UAV 100 may proceed to travel along the power cables 102, 103 (e.g., blocks 1030 through 1060 of FIG. 10).

Returning to block 1115, in some examples, the arms 140, 150 cannot be positioned to spread the electrode assemblies 145, 155 by the distance matching the distance between the power cables 102, 103. If the arms 140, 150 cannot be positioned to spread the electrode assemblies 145, 155 by the distance matching the distance between the power cables 102, 103 (block 1115 returns a result of NO), the example guidance system 410 determines whether another UAV is nearby (block 1140). In examples disclosed herein, the example guidance system 410 determines whether another UAV is nearby by attempting to communicate with nearby UAVs via the communications system 412 (e.g., using a short-range wireless radio). In such an example, the other UAV may be considered nearby when it is within wireless communication range. In some examples, the example guidance system 410 communicates with a central delivery control system to determine whether another UAV is nearby (e.g., within a specified distance). In some examples, additional criteria may additionally or alternatively be used such as, for example, whether the nearby UAV is traveling along a similar path, the capabilities of the nearby UAV, etc. If no nearby UAV exists (block 1140 returns a result of NO), the example guidance system 410 does not couple the UAV 100 to the power cables 102, 103 (block 1155). The coupling is then considered to be unsuccessful, and the UAV 100 may travel to the destination without utilizing the capacitive coupling (e.g., block 1007 of FIG. 10).

If a nearby UAV exists (block 1140 returns a result of YES), the example guidance system 410 communicates with the nearby UAV via the communications system 412, and directs the movement controller 420 and the UAV interconnector 480 to interconnect the UAVs (block 1145). In examples disclosed herein, the UAVs perform an interconnection maneuver (e.g., the interconnection maneuver shown in the illustrated example of FIG. 7) to cause the magnetic couplings of the corresponding UAV interconnectors to attach to each other. However, any other approach to interconnecting the UAVs may additionally or alternatively be used. The example guidance system 410 configures the UAV to utilize a first electrode of the first UAV (e.g., an electrode that is to couple with a first power cable) and a second electrode of the second UAV (e.g., an electrode that is to couple with a second power cable) by configuring the transformer 402 and/or the power control electronics 406 (block 1150). Upon disconnection of the UAVs, the example guidance system 410 returns the transformer 402 and/or the power electronics 406 to their initial state (e.g., utilizing two electrodes of the same UAV). The UAVs then become coupled to the power cables 102, 103 (blocks 1125 through 1135) and travel along the power cables to the destination (blocks 1030 through 1060 of FIG. 10).

Figure 12:
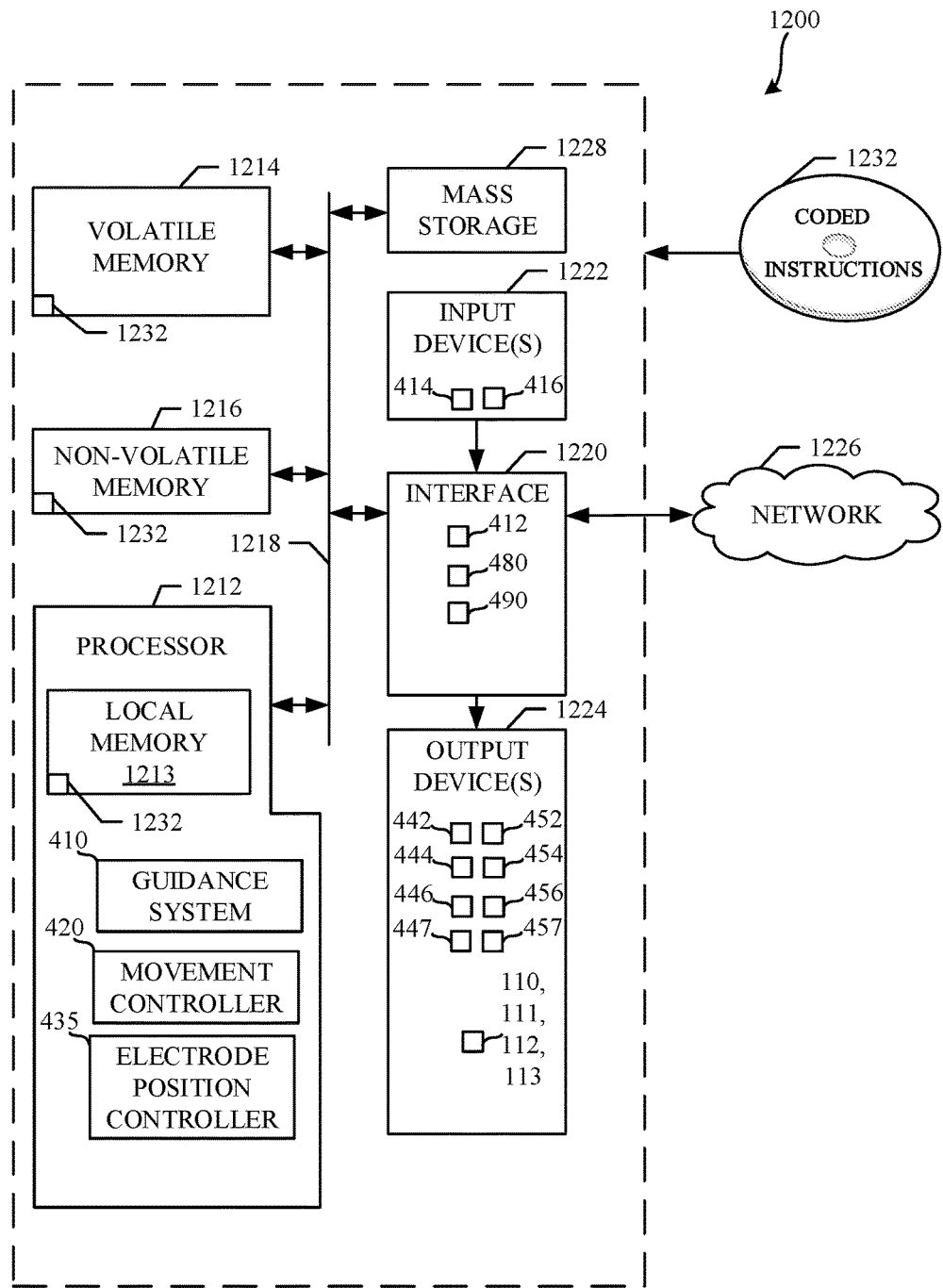
FIG. 12 is a block diagram of an example processor platform that may execute the instructions of FIG. 9, FIG. 10, an/or FIG. 11 to implement the example UAV 100 of FIGS. 1 and/or 4.

FIG. 12 is a block diagram of an example processor platform 1200 capable of executing the instructions of FIGS. 9, 10, and/or 11 to implement the example UAV 100 of FIGS. 1 and/or 4. The processor platform 1200 can be, for example, a server, a personal computer, a mobile device (e.g., a cell phone, a smart phone, a tablet such as an iPad™), a personal digital assistant (PDA), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache) and executes instructions to implement the example guidance system 410, the example movement controller 420, and/or the example electrode position controller 435. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint, a magnetic sensor, and/or a voice recognition system. In examples disclosed herein, the example input device(s) 1222 implement the example image sensor 414 and the example magnetic sensor 416.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor. In examples disclosed herein, the example output devices 1224 implement the example arm pitch servo 442, 452, the example arm length actuator 444, 454, the example electrode pitch servo 446, 456, the example electrode actuator 447,457, the example rotors 110, 111, 112, 113.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.). The example interface circuit may implement the example communications system 412, the example UAV interconnector 480, and/or the example payload connector 490.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 9, 10, and/or 11 may be stored in the mass storage device 1228, in the volatile memory 1214, in the non-volatile memory 1216, and/or on a removable tangible computer readable storage medium such as a CD or DVD.

Example 1 includes an unmanned aerial vehicle including a first electrode assembly to capacitively couple to a first power cable, a second electrode assembly to capacitively couple to a second power cable, the first and second electrode assemblies, when capacitively coupled to the respective first and second power cables, to receive power from at least one of the first and second power cables, and a power storage circuit to store the received power.

Example 2 includes the unmanned aerial vehicle of example 1, wherein the first electrode assembly does not touch the first power cable and the second electrode assembly does not touch the second power cable.

Example 3 includes the unmanned aerial vehicle of any one of examples 1 or 2, and further includes a first arm to couple the first electrode assembly to a body of the unmanned aerial vehicle. Example 3 further includes a second arm to couple the second electrode assembly to the body of the unmanned aerial vehicle.

Example 4 includes the unmanned aerial vehicle of example 3, and further includes an actuator to control a length of the first arm.

Example 5 includes the unmanned aerial vehicle of example 3, and further includes an arm pitch servo to control an angle of the first arm with respect to the body of the unmanned aerial vehicle.

Example 6 includes the unmanned aerial vehicle of example 3, and further includes an electrode pitch servo to control an angle of the first electrode assembly with respect to the first arm.

Example 7 includes the unmanned aerial vehicle of example 3, wherein the first electrode assembly includes a first electrode and a first dielectric.

Example 8 includes the unmanned aerial vehicle of example 7, wherein the first dielectric is made of Teflon.

Example 9 includes the unmanned aerial vehicle of example 7, wherein the first electrode assembly further includes an actuator to control a length of the first electrode.

Example 10 includes the unmanned aerial vehicle of any one of examples 1-3, and further includes an electrode position controller to control a first position of the first electrode assembly and a second position of the second electrode assembly, the electrode position controller to control the first and second position to facilitate capacitive coupling with the first and second power cables.

Example 11 includes the unmanned aerial vehicle of example 10, wherein the electrode position controller is further to control a distance between the first electrode assembly and the second electrode assembly to correspond to a separation between the first power cable and the second power cable.

Example 12 includes the unmanned aerial vehicle of example 11, and further includes a guidance system to control operation of one or more rotors to position the first electrode assembly within a capacitive coupling distance of the first power cable and to position the second electrode assembly within the capacitive coupling distance of the second power cable.

Example 13 includes the unmanned aerial vehicle of example 12, wherein the capacitive coupling distance is less than ten centimeters.

Example 14 includes the unmanned aerial vehicle of any one of examples 1, 2, 3, or 10, wherein the first and second power cables are to carry respective first and second phases of a three phase high voltage alternating current power delivery system.

Example 15 includes the unmanned aerial vehicle of any one of examples 1-14, and further includes a wire to interconnect the unmanned aerial vehicle to another unmanned aerial vehicle while the first electrode assembly is capacitively coupled to the first power cable.

Example 16 includes a method to wirelessly power an unmanned aerial vehicle, the method including identifying a first power cable and a second power cable, determining, by executing an instruction with a processor, a distance between the first power cable and the second power cable, positioning first and second electrode assemblies apart by a distance corresponding to the distance between the first power cable and the second power cable, and operating one or more rotors to position the first electrode assembly within a capacitive coupling distance of the first power cable, and the second electrode assembly within the capacitive coupling distance of the second power cable.

Example 17 includes the method of example 16, and further includes receiving power via a capacitive coupling with the power cables.

Example 18 includes the method of any one of examples 16 or 17, wherein the determining of the distance is implemented by processing an image received via an image sensor of the unmanned aerial vehicle.

Example 19 includes the method of one of examples 16-18, and further includes collecting a payload.

Example 20 includes the method of example 19, and further includes traveling along the power cables towards a destination of the payload.

Example 21 includes the method of example 20, and further includes delivering the payload.

Example 22 includes the method of example 16, and further includes connecting the unmanned aerial vehicle to another unmanned aerial vehicle via a wire while the first electrode assembly is capacitively coupled to the first power cable.

Example 23 includes a non-transitory machine readable storage medium comprising instructions which, when executed, cause a machine to at least identify a first power cable and a second power cable, determine a distance between the first power cable and the second power cable, position first and second electrode assemblies apart by a distance corresponding to the distance between the first power cable and the second power cable, and operate one or more rotors to position the first electrode assembly within a capacitive coupling distance of the first power cable, and the second electrode assembly within the capacitive coupling distance of the second power cable.

Example 24 includes the non-transitory machine readable storage medium of example 23, wherein the instructions, when executed, cause the machine to receive power via a capacitive coupling with the power cables.

Example 25 includes the non-transitory machine readable storage medium of any one of examples 23 or 24, wherein the instructions, when executed, cause the machine to determine the distance by processing an image received via an image sensor of the machine.

Example 26 includes the non-transitory machine readable storage medium of any one of examples 23-25, wherein the instructions, when executed, cause the machine to collect a payload.

Example 27 includes the non-transitory machine readable storage medium of example 26, wherein the instructions, when executed, cause the machine to travel along the power cables towards a destination of the payload.

Example 28 includes the non-transitory machine readable storage medium of example 27, wherein the instructions, when executed, cause the machine to deliver the payload.

Example 29 includes the non-transitory machine readable storage medium of example 23, wherein the instructions, when executed, cause the machine to connect the machine to an unmanned aerial vehicle via a wire while the first electrode assembly is capacitively coupled to the first power cable.

Example 30 includes an apparatus to wirelessly power an unmanned aerial vehicle, the apparatus including means for identifying a first power cable and a second power cable, means for determining a distance between the first power cable and the second power cable, means for positioning first and second electrode assemblies apart by a distance corresponding to the distance between the first power cable and the second power cable, and means for operating one or more rotors to position the first electrode assembly within a capacitive coupling distance of the first power cable, and the second electrode assembly within the capacitive coupling distance of the second power cable.

Example 31 includes the apparatus of example 30, and further includes means for receiving power via a capacitive coupling with the power cables.

Example 32 includes the apparatus of any one of examples 30 or 31, wherein the determining of the distance is implemented by processing an image received via an image sensor of the unmanned aerial vehicle.

Example 33 includes the apparatus of any one of examples 30-32, and further includes means for collecting a payload.

Example 34 includes the apparatus of example 33, and further includes means for traveling along the power cables towards a destination of the payload.

Example 35 includes the apparatus of example 34, and further includes means for delivering the payload.

Example 36 includes the apparatus of example 30, and further includes means for connecting the unmanned aerial vehicle to another unmanned aerial vehicle via a wire while the first electrode assembly is capacitively coupled to the first power cable.

From the foregoing, it will be appreciated that the above disclosed methods, apparatus and articles of manufacture enable a UAV to capacitively couple to power cables and receive power via the capacitive coupling. In examples disclosed herein, the power received via the capacitive coupling enables the UAV to operate (e.g., to operate rotors and/or circuitry within the UAV) and/or charge a power storage circuit (e.g., a battery) of the UAV. Operating using power received via the capacitive coupling and/or charging a battery of the UAV enables the UAV to travel for farther distances. Utilizing capacitive coupling enables the UAV to charge while in motion and addresses difficulties associated with conductively coupling the UAV to a power line. As a result, payload deliveries using the UAV may be completed without the need for the stopping during a delivery to recharge a battery of the UAV. Operating without stopping results in more timely deliveries of payloads, and increases the number of payloads that can be delivered by a fleet of UAVs during a period of time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned aerial vehicle comprising:
   a first electrode assembly configured to capacitively couple to a first power cable to receive power from the first power cable;
   a second electrode assembly configured to capacitively couple to a second power cable to receive power from the second power cable; and
   a power storage circuit configured to store the received power from the first power cable and/or the second power cable,
   wherein the first and second power cables carry respectively first and second phases of a three phase high voltage alternating current power delivery system, and
   wherein the first and second electrode assemblies are spaced apart by a distance corresponding to a distance between the first power cable and the second power cable.

2. The unmanned aerial vehicle of claim 1, further including an electrode position controller configured to control a first position of the first electrode assembly and a second position of the second electrode assembly, the electrode position controller configured to control the first and second position so that the first electrode assembly does not touch the first power cable and the second electrode assembly does not touch the second power cable.

3. The unmanned aerial vehicle of claim 1, further including:
   a first arm coupling the first electrode assembly to a body of the unmanned aerial vehicle; and
   a second arm coupling the second electrode assembly to the body of the unmanned aerial vehicle.

4. The unmanned aerial vehicle of claim 3, further including an actuator configured to control a length of the first arm.

5. The unmanned aerial vehicle of claim 3, further including an arm pitch servo configured to control an angle of the first arm with respect to the body of the unmanned aerial vehicle.

6. The unmanned aerial vehicle of claim 3, further including an electrode pitch servo configured to control an angle of the first electrode assembly with respect to the first arm.

7. The unmanned aerial vehicle of claim 3, wherein the first electrode assembly includes a first electrode and a first dielectric.

8. The unmanned aerial vehicle of claim 7, wherein the first dielectric is made of Teflon.

9. The unmanned aerial vehicle of claim 1, further including a first wire configured to interconnect the unmanned aerial vehicle to a second unmanned aerial vehicle when the first electrode assembly is capacitively coupled to the first power cable.

10. The unmanned aerial vehicle of claim 9, wherein the first wire is configured to interconnect the unmanned aerial vehicle to the second unmanned aerial vehicle by electrically connecting to a second wire of the second unmanned aerial vehicle.

11. The unmanned aerial vehicle of claim 10, wherein the first wire comprises a magnetic coupling terminal configured to electrically connect to a magnetic coupling terminal of the second wire of the second unmanned aerial vehicle.

12. An unmanned aerial vehicle comprising:
a first electrode assembly comprising a first electrode, the first electrode assembly configured to capacitively couple to a first power cable to receive power from the first power cable;
a second electrode assembly configured to capacitively couple to a second power cable to receive power from the second power cable;
a power storage circuit configured to store the power received from the first power cable and/or the second power cable; and
wherein the first electrode assembly further includes an electrode actuator configured to adjust a length of the first electrode assembly.

13. The unmanned aerial vehicle of claim 12, the first electrode assembly further comprising a third electrode electrically and mechanically coupled to the first electrode.

14. The unmanned aerial vehicle of claim 13, wherein the length of the first electrode assembly is a length from a distal end of the first electrode to a distal end of the third electrode.

15. The unmanned aerial vehicle of claim 13, wherein the first electrode assembly further comprises a third dielectric coupled to the third electrode and a first dielectric coupled to the first electrode.

16. The unmanned aerial vehicle of claim 12, wherein the second electrode assembly includes a second dielectric coupled to a second electrode.

17. An unmanned aerial vehicle comprising:
a first electrode assembly comprising a first electrode and a first dielectric, the first electrode assembly configured to capacitively couple to a first power cable to receive power from the first power cable;
a second electrode assembly configured to capacitively couple to a second power cable to receive power from the first power cable;
a power storage circuit configured to store the power received from the first power cable and/or the second power cable;
an electrode position controller configured to control a first position of the first electrode assembly and a second position of the second electrode assembly, the electrode position controller configured to control the first and second position to facilitate capacitive coupling with the first and second power cables, and
wherein the electrode position controller is further configured to control a distance between the first electrode assembly and the second electrode assembly to correspond to a separation between the first power cable and the second power cable.

18. The unmanned aerial vehicle of claim 17, further including a guidance system configured to control operation of one or more rotors to position the first electrode assembly within a capacitive coupling distance of the first power cable and to position the second electrode assembly within the capacitive coupling distance of the second power cable.

19. The unmanned aerial vehicle of claim 18, wherein the capacitive coupling distance is less than ten centimeters.

* * * * *